(12) United States Patent
Altenschmidt

(10) Patent No.: US 7,171,953 B2
(45) Date of Patent: Feb. 6, 2007

(54) METHOD FOR OPERATING AN INTERNAL COMBUSTION ENGINE WITH DIRECT FUEL INJECTION

(75) Inventor: Frank Altenschmidt, Biberach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/527,458

(22) PCT Filed: Sep. 9, 2003

(86) PCT No.: PCT/EP03/09988

§ 371 (c)(1),
(2), (4) Date: Nov. 22, 2005

(87) PCT Pub. No.: WO2004/027239

PCT Pub. Date: Apr. 1, 2004

(65) Prior Publication Data

US 2006/0137647 A1    Jun. 29, 2006

(30) Foreign Application Priority Data

Sep. 12, 2002  (DE) ................................. 102 42 227

(51) Int. Cl.
*F02M 51/00* (2006.01)
*F02M 51/02* (2006.01)
(52) U.S. Cl. ...................................... 123/491; 123/299
(58) Field of Classification Search ................ 123/299, 123/491, 300, 305, 295, 478, 435, 436, 179.16, 123/179.17
See application file for complete search history.

(56) References Cited

U.S. PATENT DOCUMENTS

| | | | |
|---|---|---|---|
| 6,439,190 B1 * | 8/2002 | Bochum | 123/295 |
| 6,848,414 B2 * | 2/2005 | West et al. | 123/299 |
| 6,899,077 B2 * | 5/2005 | Wagner et al. | 123/295 |
| 2005/0011484 A1 * | 1/2005 | Wagner et al. | 123/295 |
| 2006/0124104 A1 * | 6/2006 | Altenschmidt | 123/299 |

* cited by examiner

*Primary Examiner*—Mahmoud Gimie
(74) *Attorney, Agent, or Firm*—Crowell & Moring LLP

(57) ABSTRACT

A method of operating an internal combustion engine with an injection device, wherein the method includes the steps of feeding combustion air to a combustion chamber via an inlet port, injecting fuel into the combustion chamber using a fuel nozzle arranged in the combustion chamber, igniting a formed fuel/air mixture at a certain ignition point using a spark plug arranged in the combustion chamber, and, during the starting of the internal combustion engine, selecting a high-pressure or a low pressure start as a function of a minimum fuel pressure built up in the injection device within a defined number of cycles. The minimum fuel pressure and the number of cycles are selected as a function of a combustion-chamber temperature. The injection of the fuel into the combustion chamber takes place in a timed sequence during the starting operation.

11 Claims, 2 Drawing Sheets

METHOD FOR OPERATING AN INTERNAL COMBUSTION ENGINE WITH DIRECT FUEL INJECTION

BACKGROUND AND SUMMARY OF THE INVENTION

The invention relates to a method of operating an internal combustion engine with direct fuel injection.

During a starting phase of a spark-ignition internal combustion engine with direct fuel injection, large quantities of unburned fuel are produced, in particular during a cold start, since the combustion-chamber temperature of the internal combustion engine is low during a cold starting phase. Therefore adequate vaporization of the injected fuel cannot take place. On account of the low cylinder-wall temperature, some fuel proportions accumulate on the cylinder wall of the internal combustion engine and do not participate in the combustion.

U.S. Pat. No. 5,482,017 discloses a method of operating a spark-ignition internal combustion engine with direct fuel injection. In this method, during a starting phase, a fuel quantity which is greater than the requisite fuel quantity is injected during the first combustion cycle in order to compensate for the fuel proportions which have accumulated on the cylinder wall. As a result, reliable ignition of the fuel/air mixture formed is achieved. During the subsequent combustion cycles, a lean fuel/air mixture is formed in the combustion chamber and is ignited earlier in order to increase the combustion-chamber temperature or the cylinder-wall temperature. In order to heat a downstream exhaust-gas treatment device, the fuel quantity, during the subsequent combustion cycles, is then divided into an early and a late injection and a later ignition of the fuel/air mixture formed is carried out.

Patent Document WO 99/67526 discloses a method of operating a spark-ignition internal combustion engine with direct fuel injection. In this method, the pressure of the fuel injected into the combustion chamber is determined, so that the fuel is injected during the induction phase of the internal combustion engine when the fuel pressure is lower than a predetermined minimum pressure. In this case, a pressure sensor is provided, by means of which the pressure of the fuel injected into the combustion chamber is measured before the fuel enters the combustion chamber. The internal combustion engine is run in a stratified operation during the starting phase if a minimum pressure is exceeded and is run in a homogenous operation if the pressure drops below the minimum pressure.

DE 198 232 80 C1 discloses a method of operating a direct-injection internal combustion engine during the starting phase, in which method, as a function of a coolant temperature, the operation is changed over between a low-pressure start with a homogenous mixture and a high-pressure start with a stratified mixture. In this case, a high-pressure start of the internal combustion engine is initiated if the pressure in a fuel pressure accumulator has exceeded a predetermined threshold value. Here, the threshold value is stored in a characteristic map of the control device as a function of a coolant temperature.

With the methods described above, no optimum combustion is achieved during the starting operation of a spark-ignition internal combustion engine with direct fuel injection, since an operating behavior of the internal combustion engine during the starting phase without spark failure cannot be ensured.

Against this background, the object of the invention is to design the injection process during the starting phase in such a way that wetting of the combustion-chamber wall with fuel during the injection process is reduced and an ignitable mixture cloud is formed in the combustion chamber of the internal combustion engine in the vicinity of an ignition source.

This object is achieved according to the invention of operating an internal combustion engine with an injection device, wherein the method includes the steps of feeding combustion air to a combustion chamber via an inlet port, injecting fuel into the combustion chamber using a fuel nozzle arranged in the combustion chamber, igniting a formed fuel/air mixture at a certain ignition point using a spark plug arranged in the combustion chamber, and, during the starting of the internal combustion engine, selecting a high-pressure or a low-pressure start as a function of a minimum fuel pressure built up in the injection device within a defined number of cycles. The minimum fuel pressure and the number of cycles are selected as a function of a combustion-chamber temperature. The injection of the fuel into the combustion chamber takes place in a timed sequence during the starting operation.

The method according to the invention is characterized in that the minimum fuel pressure and the number of cycles during the starting of the internal combustion engine are selected as a function of a combustion-chamber temperature, the injection of the fuel into the combustion chamber preferably taking place in a timed sequence during the starting operation. Due to the timed sequence of the injected fuel quantity during a cycle, wetting of the combustion-chamber wall with the injected fuel is minimized, as a result of which the emissions, in particular the unburned fuel proportions, are reduced during the starting phase. Since a high-pressure start is not initiated until sufficient fuel pressure is present, improved atomization of the injected fuel is ensured. Furthermore, a pressure drop in the injection device during the high-pressure start on account of the high demand for fuel during the starting of the internal combustion engine is prevented by the timed sequence of the injected fuel quantity.

In a configuration of the method according to the invention, during the starting operation, the total fuel quantity injected is introduced into the combustion chamber in up to three partial quantities, i.e. the total fuel quantity can be optionally introduced into the combustion chamber in the form of one, two or three partial quantities. The timed sequence of the injected fuel quantity prevents combustion air from penetrating into the fuel injector or into the fuel distribution line, for example a common rail, during a low-pressure start on account of the low fuel system pressure. The injection during the compression stroke therefore takes place early enough irrespective of the injection strategy, so that the compression pressure does not exceed the fuel injection pressure. During the high-pressure start, due to the timed sequence of the injected fuel quantity, a homogeneous start, a mixed form consisting of a homogenous and a stratified start, or a pure stratified start can be achieved by varying the injection times.

According to a further configuration of the invention, during a low-pressure start, the up to three partial quantities are injected into the combustion chamber before the ignition point, and, during a high-pressure start, the up to two partial quantities are injected into the combustion chamber before the ignition point and one partial quantity is injected into the combustion chamber after the ignition point. Since, during the low-pressure start, the injection of the partial quantities—there may be one, two or three partial quantities—is completed before the ignition point, high HC emissions are prevented and reliable combustion of the total fuel quantity is ensured.

In a further configuration of the invention, the ignition point during the starting operation is regulated as a function of the combustion-chamber temperature and a difference between an actual speed and an idling speed. The relationship between the ignition point and the combustion-chamber temperature ensures that the combustion-chamber temperature is increased during the first cycles.

According to a further configuration of the invention, during a high-pressure start, if the fuel pressure drops below a defined minimum pressure in the injection device, the operation is changed over to the low-pressure start. This creates defined pressure conditions which permit controlled metering of fuel. This ensures that no wall wetting takes place due to the late injection of fuel.

In a further configuration of the invention, the combustion-chamber temperature is recorded by means of a temperature-measuring device at the combustion chamber or with reference to a coolant temperature of the internal combustion engine. A temperature probe is preferably attached to the cylinder wall in the region of the combustion chamber. Alternatively, a coolant temperature serves as a reference quantity for determining the combustion-chamber temperature, it being possible, in addition to or as an alternative to the coolant temperature, for the temperature of the drawn-in air mass to be used as a further reference quantity for determining the combustion-chamber temperature.

According to a further configuration of the invention, a low-pressure start is effected at a coolant temperature of less than −15° C. or greater than 90° C., a high-pressure start being effected at a minimum fuel pressure, built up in the injection device, of at least 10 bar and at a coolant temperature of between −15° C. and 90° C. At a fuel pressure of at least 10 bar, good spray quality of the injected fuel is ensured and vaporization of the injected fuel is achieved without fuel accumulating on the wall. In this case, a low-temperature start is preferred at temperatures greater than 90° C., since, due to high temperatures in the combustion chamber, sufficient fuel pressure often cannot be built up during a restarting operation of the internal combustion engine on account of the increasing gap sizes in the fuel pump. The low-pressure start preferably takes place within a temperature range of less than −30° C. or greater than 110° C., and the high-pressure start preferably takes place between −30° C. and 110° C.

Further features and feature combinations follow from the description. Practical exemplary embodiments of the invention are shown simplified in the drawings and are described in more detail below.

DETAILED DESCRIPTION OF THE DRAWINGS

Figure 1:
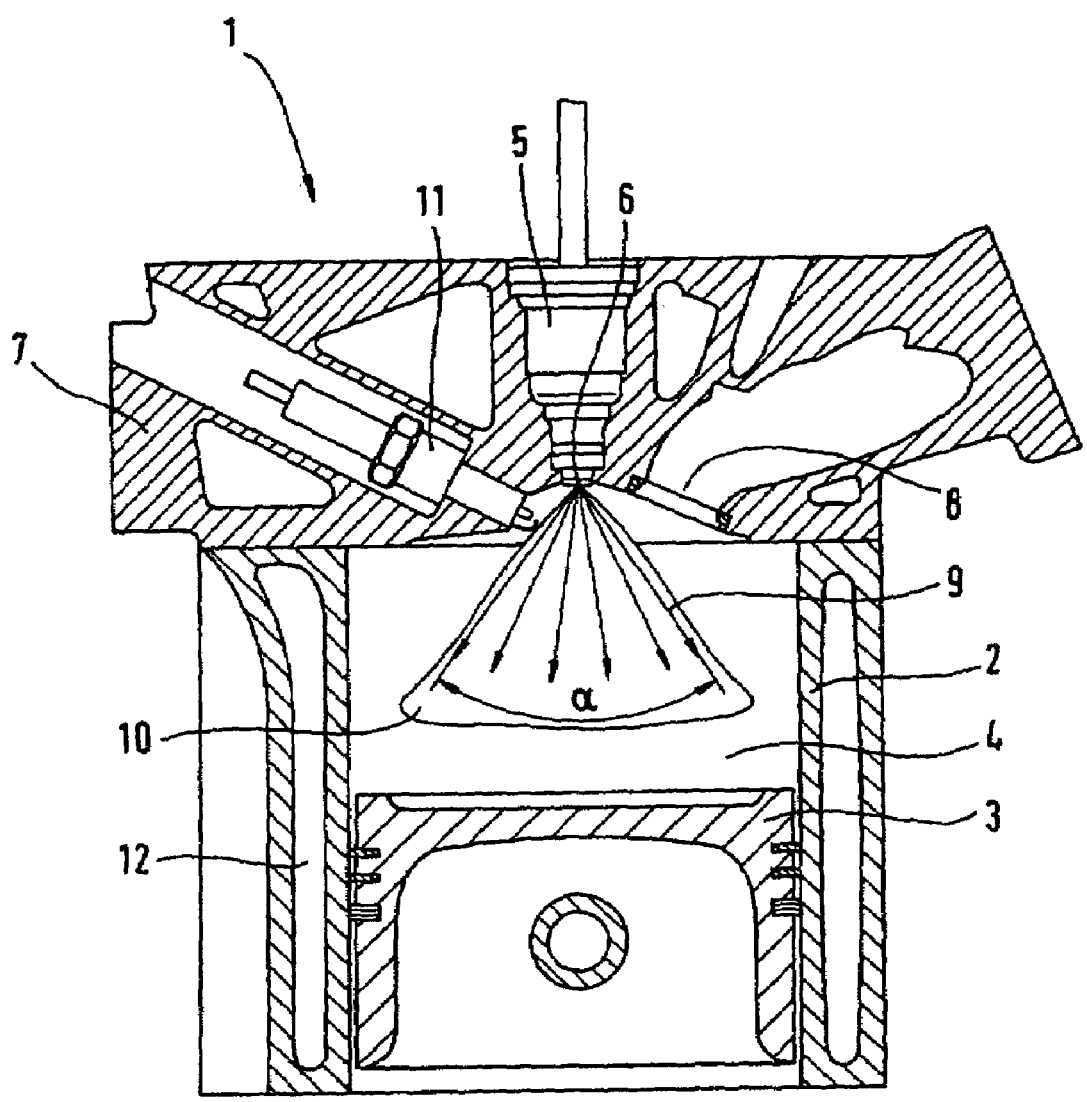
FIG. 1 shows a cylinder cross section of a direct-injection internal combustion engine with spark ignition.

FIG. 1 shows a cylinder 2 of a direct-injection internal combustion engine 1, in which a piston 3, arranged in a longitudinally movable manner, together with a cylinder head 7 closing the cylinder 2 defines a combustion chamber 4. Arranged in the cylinder head 7 is a fuel injector 5, in which fuel is injected in the form of a fuel cone 9 into the combustion chamber 4 through a nozzle hole 6. In the internal combustion engine 1, during a starting phase, by means of a fuel pressure determined in an injection device (not shown), a control device (not shown) determines whether a high-pressure start or a low-pressure start is initiated during the starting of the internal combustion engine 1. When the nozzle hole 6 is opened up, the fuel is injected in a conical spray 9 into the combustion chamber 4 in such a way that the spark plug 11 arranged in the cylinder head 7 is essentially not wetted. In this case, the fuel spray 9 is introduced into the combustion chamber with a spray angle α which preferably lies within a range of between 70° and 110°. The internal combustion engine 1 shown in FIG. 1 works according to the four-stroke principle, the method according to the invention likewise being suitable for spark-ignition two-stroke internal combustion engines with direct injection.

In the first stroke of an operating cycle of the internal combustion engine from FIG. 1 working according to the four-stroke principle, combustion air is fed to the combustion chamber 4 through an inlet port 8, the piston 3 moving downward to a bottom dead center BDC. In a further compression stroke, the piston 3 moves upward from the bottom dead center BDC up to a top ignition dead center IDC. In the region of the ignition dead center IDC, the fuel/air mixture formed is ignited by means of the spark plug 11, in the course of which the piston 3 expands in a downward movement to a bottom dead center BDC. In a last stroke, the piston 3 extends in an upward movement up to a top dead center TDC and expels the exhaust gases from the combustion chamber 4.

Depending on a cooling-water temperature measured in a cooling-water passage 12, a control device (not shown) establishes whether a high-pressure or a low-pressure start is carried out during the starting phase of the internal combustion engine. A high-pressure start is initiated when a minimum fuel pressure is present in a fuel supply line (not shown), which is designed, for example, as a fuel common rail. The minimum fuel pressure is established as a function of the cooling-water temperature determined. This minimum fuel pressure is at least 10 bar. At such a fuel pressure, it is ensured that good atomization quality is achieved. The minimum fuel pressure must in turn be built up after a defined number of combustion cycles. According to the present exemplary embodiment, a cycle refers to a process from the first to the fourth stroke according to the four-stroke sequence described above. The minimum fuel pressure is preferably to be built up after approximately four seconds. In this case, the number of combustion cycles is established as a function of the cooling-water temperature.

Figure 2:
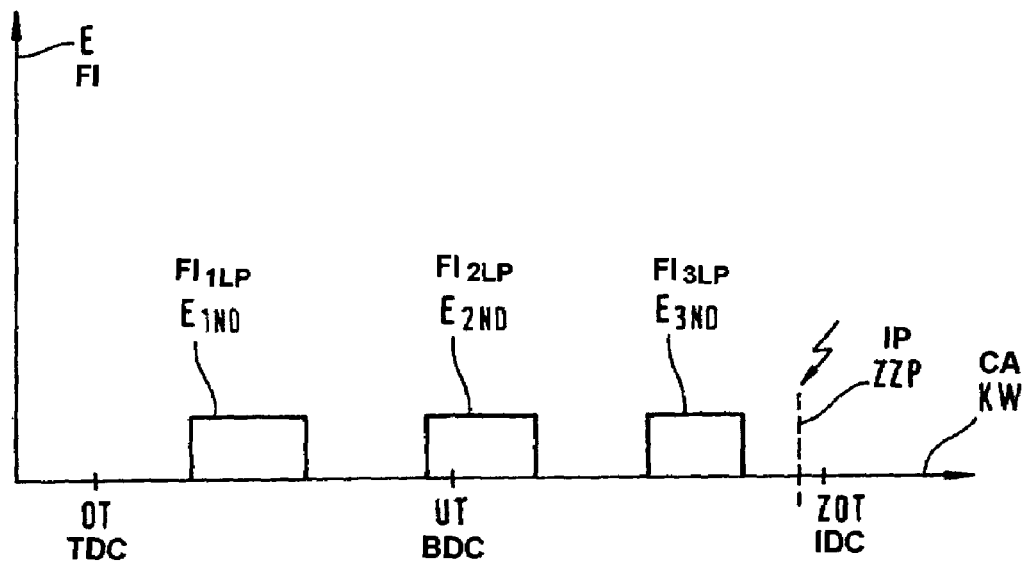
FIG. 2 shows a schematic diagram of the injection characteristic of the internal combustion engine according to FIG. 1 during a low-pressure start, plotted against the crank angle.

If the fuel pressure does not reach the minimum fuel pressure after a defined number of cycles, a low-pressure start is initiated. According to FIG. 2, the fuel is introduced in up to three partial quantities into the combustion chamber before the ignition point IP. The division of the fuel quantity permits better distribution of the injected fuel in the combustion chamber 4 and relieves the fuel system. The first partial quantity $FI1_{LP}$ is introduced into the combustion chamber 4 during the induction phase. The second partial quantity $FI2_{LP}$ appears in a region between a final part of the induction phase and an initial part of the compression phase. The third partial quantity $FI3_{LP}$ then appears just before the ignition point IP, so that an ignitable mixture cloud is present in the region of the spark plug 11. The injection times shown in FIG. 2 are illustrated schematically; they can be freely selected, in which case they are varied as a function of an actual speed and/or of a cooling-water temperature.

The end of the fuel injections $FI1_{LP}$, $FI2_{LP}$, $FI3_{LP}$ is established via three characteristic maps. The characteristic maps are each defined via the cooling-water temperature and the number of cycles. In this case, the fuel injection is configured in such a way that overlapping of fuel injections is prevented. It is therefore conceivable to establish the end of the third injection $FI3_{LP}$ and the two preceding injections $FI1_{LP}$ and $FI2_{LP}$ via delay times or differential angles. During the low-pressure start, the injection period of the last injection $FI3_{LP}$ is limited on account of the low fuel pressure in order to prevent fuel and air from entering the injector. In this case, pressure compensation ensures that the correct injection time is always set. During the low-pressure start, a pressure regulator in the injection device is preferably kept open in order to achieve defined pressure conditions in the fuel distribution line of the injection device. The injection times shown in FIG. 2 of the three partial quantities are only shown as an example, the injection times being freely selectable and being varied as a function of the fuel pressure in the injection device. In principle, a low-pressure start takes place at a coolant temperature of less than −15° C. or greater than 90° C.

Figure 3:
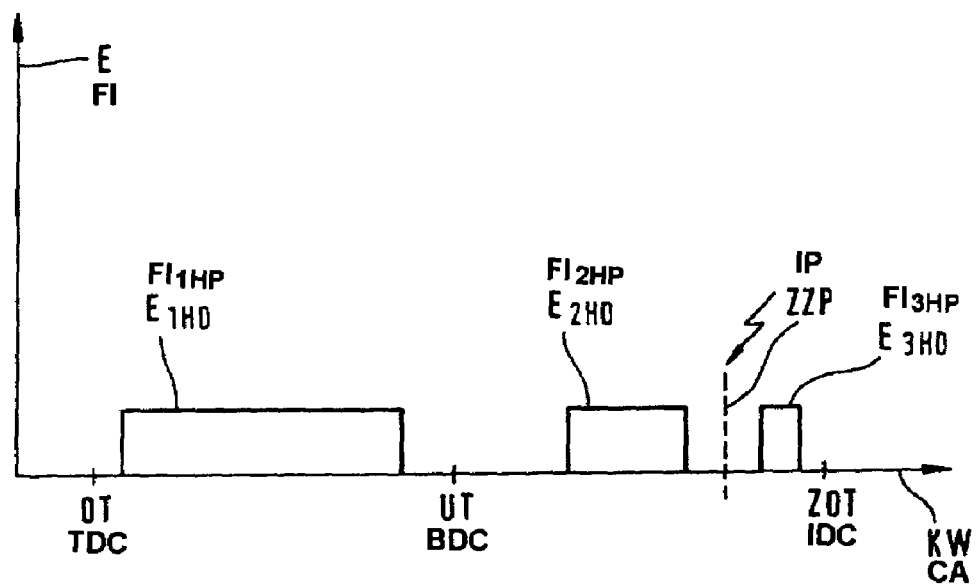
FIG. 3 shows a schematic diagram of the injection characteristic of the internal combustion engine according to FIG. 1 during a high-pressure start, plotted against the crank angle.

If the minimum fuel pressure is reached after a defined number of cycles, a high-pressure start is initiated. When a high-pressure start is initiated, the injection timing is defined via the end of injection. In this way, a direct relationship to the ignition is established and thus simple control of the fuel injection is achieved. According to FIG. 3, the injection of the fuel during the high-pressure start is effected in up to three partial quantities $FI1_{HP}$, $FI2_{HP}$ and $FI3_{HP}$. The first partial quantity $FI1_{HP}$ is injected during the induction phase. The division of the fuel mass is established with the aid of characteristic maps which are stored in the control unit and in which the end of the first injection $FI1_{HP}$ is established independently of the ignition point IP via the cooling-water temperature, an actual speed and an idling speed. The second fuel injection $FI2_{HP}$ is effected during the compression phase in such a way that the interval between the end of the second fuel injection $FI2_{HP}$ and the ignition point IP is established as a function of the cooling-water temperature, the actual speed and the idling speed. The third fuel injection $FI3_{HP}$ is effected just after the ignition point IP, the third fuel injection $FI3_{HP}$ being established via a delay time between the second and the third fuel injection $FI3_{HP}$ in such a way that it participates in the combustion. It is conceivable for only a single fuel injection to be carried out during the high-pressure start, this single fuel injection then advantageously taking place within a range of 40° C.A to 160° C.A before IDC.

Accordingly, a combined combustion-chamber charge consisting of homogeneous charge and stratified charge is achieved during the high-pressure start. The first partial fuel quantity constitutes the homogeneous proportion and the second and the third partial fuel quantity constitute the stratified proportion. As a result, accumulations of fuel on the wall are minimized and reliable ignition of the fuel cloud formed is achieved. It is preferably ensured by means of pressure compensation in the fuel injection device that the correct injection time is always selected during the starting phase.

With the described multiple injection during the starting phase, the operating behavior of the internal combustion engine 1 is improved, in particular the formation of emissions due to the unburned fuel proportion on account of a low wall temperature being minimized. These advantages are preferably obtained when using a piezoelectric injector, in which short injection times, for example less than 0.25 msec, can be achieved. This makes possible the injection of very small partial fuel quantities into the combustion chamber 4, and the requisite fuel quantity for the starting operation of the internal combustion engine 1 is greatly reduced.

During the starting phase, the ignition point IP is controlled as a function of the cooling-water temperature and the engine speed by means of the control unit during both the low-pressure and the high-pressure start. In this case, the ignition point IP is stored in a characteristic map, in which the ignition point IP is plotted against the cooling-water temperature, the difference between the actual speed and the idling speed. After leaving the starting phase, the ignition point IP is brought into line with the normal operating state. The ignition points applied in the control unit are stored in separate characteristic maps for the low-pressure and the high-pressure start.

In particular, the method according to the invention is suitable for use in direct-injection internal combustion engines with spark ignition, in which a spray-directed combustion behavior is present. Injection nozzles opening outward are used in such internal combustion engines, the fuel in these injection nozzles being injected as a hollow cone into the combustion chamber. The fuel is preferably introduced into the combustion chamber as a hollow fuel cone having an angle α of between 70° and 100°, so that the hollow fuel cone, during a fuel injection in the compression stroke, strikes combustion air compressed in the combustion chamber. As a result, a toroidal swirl is formed in the outer region or at the margin of the injected hollow fuel cone, whereby an ignitable fuel/air mixture is provided in the region of the electrodes of the spark plug. In this case, the spark plug is arranged in such a way that the electrodes of the spark plug 11 project into the marginal swirl achieved without being substantially wetted during the fuel injection; i.e., during light or slight wetting of the electrodes of the spark plug, the largest proportion of the fuel should be vaporized again at the electrodes up to the ignition point.

The invention claimed is:

1. A method of operating an internal combustion engine with an injection device, comprising:
    feeding combustion air to a combustion chamber via an inlet port;
    injecting fuel into the combustion chamber using a fuel nozzle arranged in the combustion chamber;
    igniting a formed fuel/air mixture at a certain ignition point using a spark plug arranged in the combustion chamber; and
    during the starting of the internal combustion engine, selecting a high-pressure or a low-pressure start as a function of a minimum fuel pressure built up in the injection device within a defined number of cycles, wherein the minimum fuel pressure and the number of cycles are selected as a function of a combustion-chamber temperature, and wherein the injection of the fuel into the combustion chamber takes place in a timed sequence during the starting operation.

2. The method as claimed in claim 1, comprising, during the starting operation, injecting fuel into the combustion chamber in up to three partial quantities.

3. The method as claimed in claim 2, comprising, during a low-pressure start, injecting the up to three partial quantities into the combustion chamber before the ignition point, and, during a high-pressure start, injecting one or two of the up to three partial quantities into the combustion chamber before the ignition point and one partial quantity is injected into the combustion chamber after the ignition point.

4. The method as claimed in claim 3, comprising determining the ignition point during the starting operation as a function of the combustion-chamber temperature and a difference between an actual speed and an idling speed.

5. The method as claimed in claim 4, comprising, during a high-pressure start, if the fuel pressure drops below a defined minimum pressure in the injection device, changing the operation over to the low-pressure start.

6. The method as claimed in claim 5, comprising recording combustion-chamber temperature using a temperature-measuring device at the combustion chamber or with reference to a coolant temperature of the internal combustion engine.

7. The method as claimed in claim 6, comprising effecting a low-pressure start at a coolant temperature of less than −15° C. or greater than 90° C., effecting a high pressure start at a minimum fuel pressure, built up in the injection device, of at least 10 bar and at a coolant temperature of between −15° C. and 90° C.

8. The method as claimed in claim 1, comprising determining the ignition point during the starting operation as a function of the combustion-chamber temperature and a difference between an actual speed and an idling speed.

9. The method as claimed in claim 1, comprising, during a high-pressure start, if the fuel pressure drops below a defined minimum pressure in the injection device, changing the operation over to the low-pressure start.

10. The method as claimed in claim 1, comprising recording combustion-chamber temperature using a temperature-measuring device at the combustion chamber or with reference to a coolant temperature of the internal combustion engine.

11. The method as claimed in claim 1, comprising effecting a low-pressure start at a coolant temperature of less than −15° C. or greater than 90° C., effecting a high pressure start at a minimum fuel pressure, built up in the injection device, of at least 10 bar and at a coolant temperature of between −15° C. and 90° C.

* * * * *